INVENTORS.
E. J. CHOJNOWSKI
R. J. WOODWARD
BY
ATTORNEY

United States Patent Office 3,147,342
Patented Sept. 1, 1964

3,147,342
SYNCHRONOUS ADAPTER
Edward J. Chojnowski, Valley Stream, N.Y., and Robert
J. Woodward, Paramus, N.J., assignors to The Western
Union Telegraph Company, New York, N.Y., a corporation of New York
Filed Mar. 29, 1961, Ser. No. 99,164
19 Claims. (Cl. 178—23)

This invention relates to a synchronous adapter and more particularly to a device which generates a probe pulse signal synchronized to indicate the occurrence of a received intelligence bearing pulse signal.

Frequently, intelligence is transmitted from one station to another by means of a signal capable of assuming a selected first or a second desired state. For example, in one commonly used procedure a first state or condition is represented by a negative potential and is referred to as a spacing pulse, and a second state or condition is represented by a ground potential and is referred to as a marking pulse. The arrangement of the pulse spacing and marking signals determine the contents of the message transmitted.

In systems which utilize signals having two states or conditions the operation of the receiving equipment must be synchronized with the intelligence signals being received. Synchronization can be accomplished easily by means of indexing signals which are transmitted along with the intelligence signals. Unfortunately, however, in most systems the transmission of indexing signals is objectionable and other means must be provided to synchronize the operation of the receiving equipment to the intelligence bearing line signals.

The structure of this invention examines and utilizes the intelligence bearing line signals to generate probe pulse signals which are used to synchronize the operation of the receiving equipment to the received line signal. The generated probe signals must be aligned with the midpoint of each incoming line signal if reliable operation is to be obtained. However, the position of the generated probe pulse signal must be examined continuously and controlled automatically to compensate for changes in the time position of the line signals which are caused by phase distortion; and to also compensate for variation in the time duration of the received line signals caused by bias distortion. The complexity of the solution of this problem becomes even more apparent when it is realized that each form of distortion can appear either alone or in combination and each in varying degrees.

It is an object of this invention to provide a device which can generate probe pulse signals to index received line signals.

It is also an object of this invention to provide a device which can generate a probe pulse signal which can be controlled to compensate for changes in the time position of the line signals caused by phase distortion.

It is another object of this invention to provide a device which can generate a probe pulse signal which can be controlled to compensate for changes in time duration of the received line signals caused by bias distortion.

It is still another object of this invention to provide a device which is reliable in operation and economical to build.

Other objects and many of the attendant advantages of this invention will be readily appreciated as the apparatus becomes better understood by reference to the following detailed description when considered in connection with the accompanying drawings wherein.

Similar reference characters refer to similar parts throughout the several views of the drawing.

Briefly, it is the function of this invention to generate probe or indexing pulse signals which are aligned centrally relative to received spacing and marking pulse signals generated at a remote source.

In this invention a train of pulse signals from a source of clock pulse signals are fed continuously to a first counter. Each instance that the counter is cycled a probe pulse signal is generated and appears as a positive going signal at the output terminal of the last stage. A second counter which can be urged to count in either a forward or a reverse direction is also coupled to count pulse signals from the source of clock pulse signals. A count direction control means coupled to the second counter divides the count period of the second counter into two parts by first urging the second counter to count in a forward or positive manner, and then urging the second counter to count in a reverse or negative manner. Additionally, the second counter is first conditioned to count the pulse signals from the source of clock pulse signals at the occurrence of a line signal transition (mark to space or space to mark), and continues to count the pulse signals until the occurrence of an internally generated probe pulse.

The accumulated count present on the second counter at the termination of two successive count periods (one full cycle) represents the error present between the time occurrence of the probe pulse signal relative to the midpoint of the received line signal, and it is this signal which is fed to the first counter to advance or retard the occurrence of the proble pulse signal to synchronize it with the received line signals. For example, the presence of a signal which indicates a "negative" sum on the second counter indicates that there was a short positive count cycle and this information is used to retard the operation of the first counter to delay the occurrence of the probe pulses. A delay in the generation of the probe pulses will shift them towards the center of the received line signals and away from the initial signal transition. In a like manner, if the signal on the second counter indicates a "positive" sum, then the operation of the first counter is accelerated to advance the occurrence of the probe pulse relative to the received line signal to attain synchronism.

Reset means is provided to reset the second counter after each of its cycles of operation to permit examination of the next received line signal.

Figure 1:
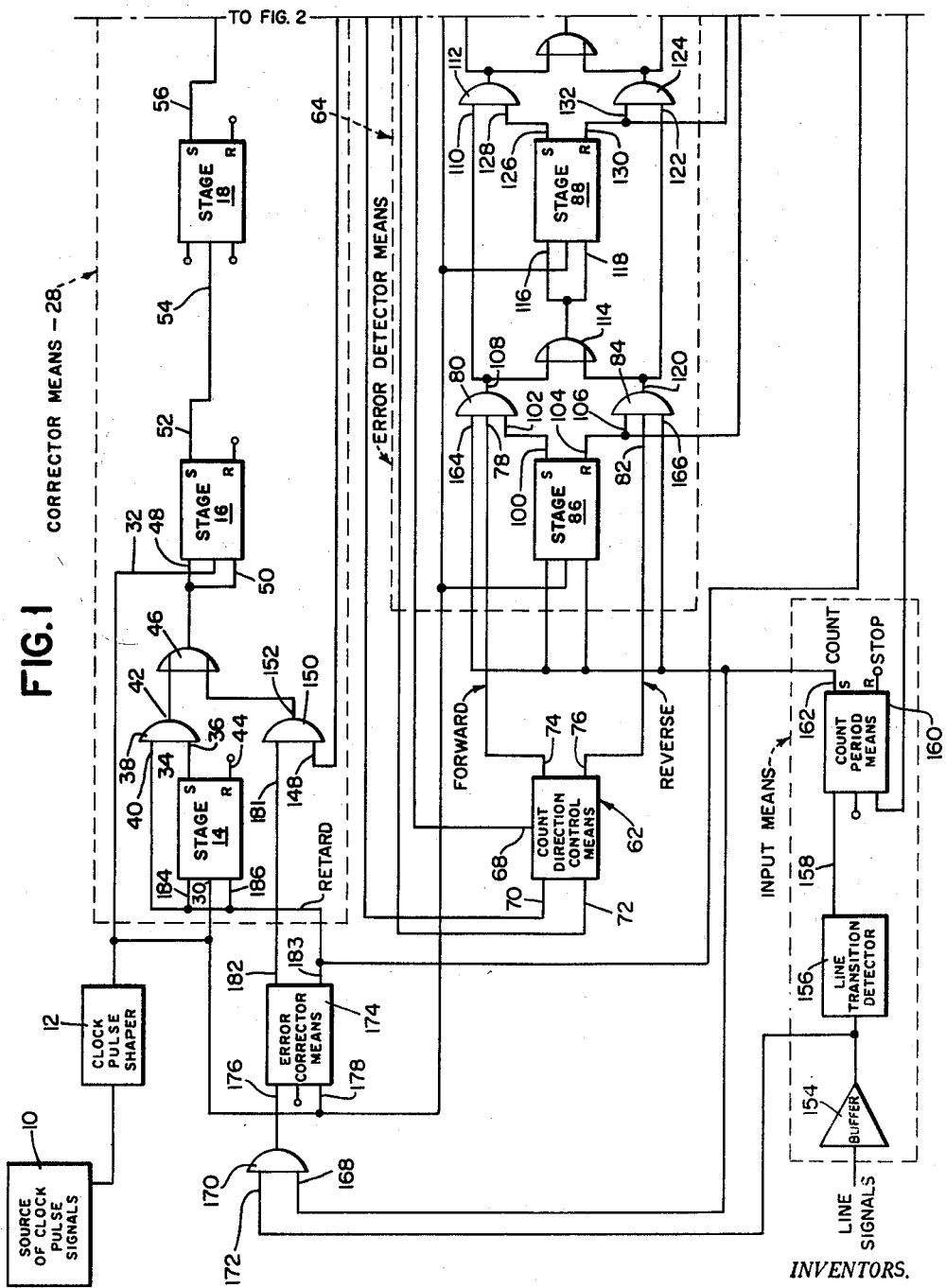
FIG. 1 is a partial block diagram of structure in accordance with the principles of this invention.
Figure 2:
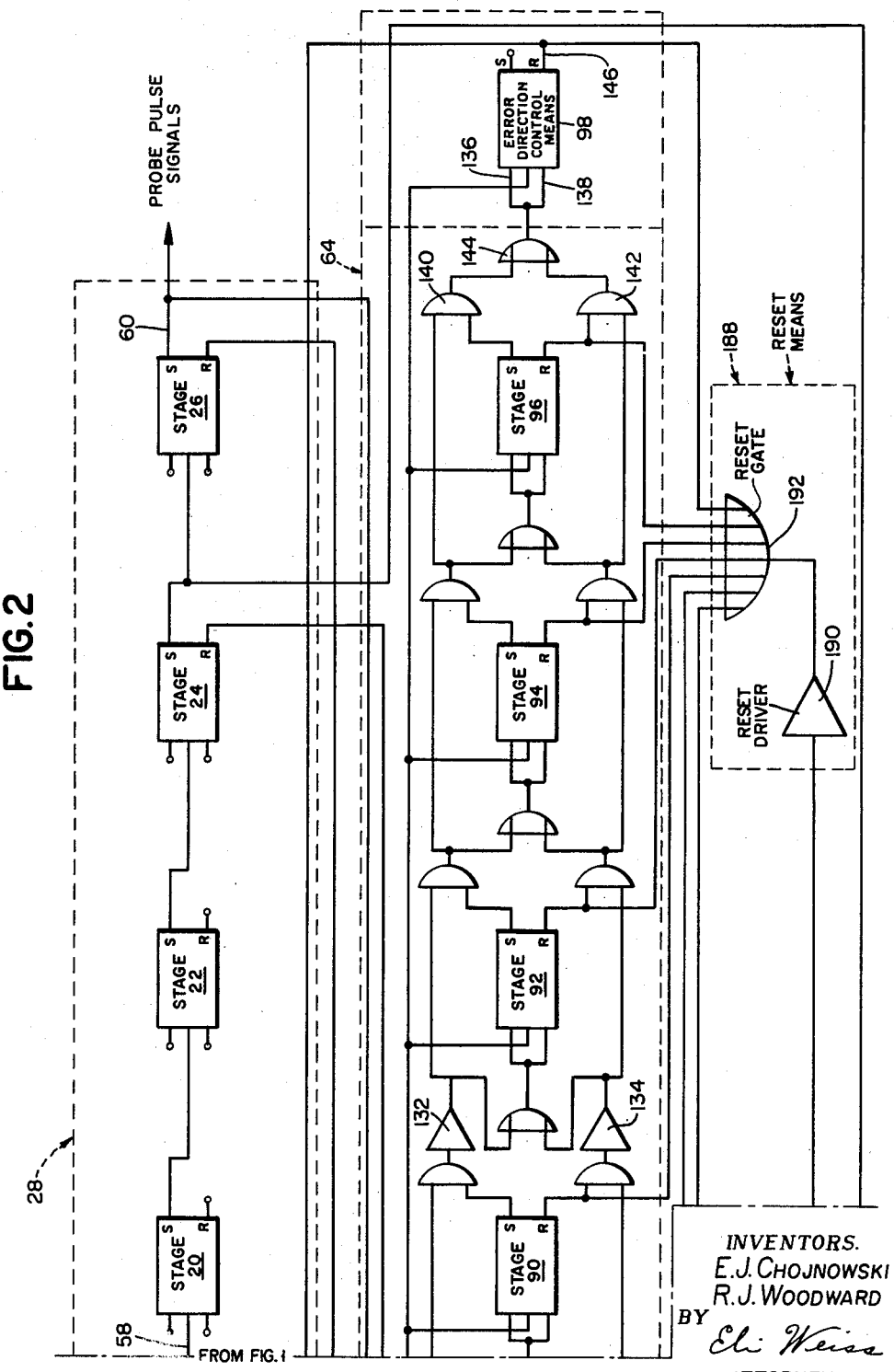
FIG. 2 is another partial block diagram of structure in accordance with the principles of this invention which, when coupled to FIG. 1 as indicated, illustrates a complete device.

With reference to FIGS. 1 and 2 there is illustrated structure in accordance with the principles of this invention. A source of clock pulse signals 10 is coupled to feed pulse signals through a clock pulse shaper 12 to a corrector means 28 which functions as a unidirectional binary counter. The corrector means is composed of seven stages 14, 16, 18, 20, 22, 24, and 26—each stage being a bistable network commonly referred to as a flip-flop. The structure and operation of the flip-flops will be described in detail in another portion of this specification, however, for the present it will be sufficient to state that each flip-flop network supports a clock pulse input terminal, a set input terminal, a reset input terminal, a set output terminal and a reset output terminal.

The clock pulse terminal 30 of flip-flop 14, and the clock pulse terminal 32 of flip-flop 16 are each coupled to receive clock pulse signals from the shaper 12. The set output terminal 34 of flip-flop 14 is coupled to input terminal 36 of AND gate 38 which supports another input terminal 40 and an output terminal 42. The reset output terminal 44 of flip-flop 14 is not utilized. The output terminal 42 of AND gate 38 is coupled through an OR gate 46 to the set 48 and reset 50 input terminals of flip-flop 16. The set output terminal 52 of flip-flop 16 is coupled to the clock pulse terminal 54 of flip-flop 18. The set input and reset input terminals of flip-flop 18 are left in an open state. In this manner there is provided a flip-flop which will operate each instant that a signal is fed to its clock pulse terminal. This mode of operation will become apparent after that portion of this description which relates to the construction and operation of the bistable network utilized here is read and understood. The output set terminal 56 of flip-flop 18 is coupled to feed a signal to the clock pulse terminal 58 of the flip-flop 20. The electrical connections provided between the flip-flop 16 and the flip-flop 18 are similar to those connections provided between the remaining flip-flops of the corrector means and, therefore, a recitation of the actual connections is not here required.

The probe pulse signal, the signal that is synchronized to the occurrence of the received line signals appears at the set output terminal 60 of the flip-flop 26.

A count direction control means 62 which is capable of assuming a first or a second state is energized by the corrector means 28 and coupled to control the mode of operation of an error detector means 64 which functions as a bidirectional counter capable of operating in either a forward direction or a reverse direction.

Figure 4:
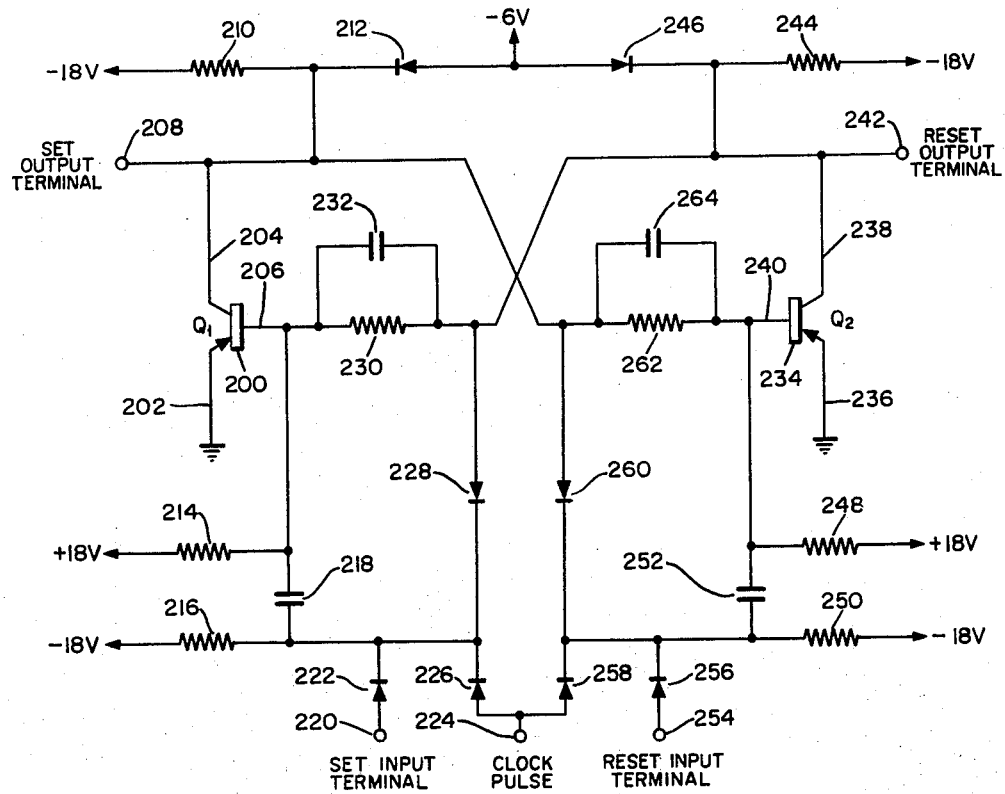
FIG. 4 is a wiring diagram of the bistable or flip-flop network used in the structure of this invention.

The count direction control means 62 can be a flip-flop similar to that disclosed in FIG. 4 and described in detail further on in this description, and supports a clock pulse input terminal 68, a set input terminal 70, a reset input terminal 72, a set output terminal 74, and a reset output terminal 76. The clock pulse input terminal 68 is coupled to the reset output terminal of flip-flop 24, set input terminal 70 is coupled to the reset output terminal of flip-flop 26, and reset input terminal 72 is coupled to the set output terminal of flip-flop 26—that terminal on which the probe pulse signals appear.

The set output terminal 74 is coupled to input terminal 78 of AND gate 80 to initiate operation of the error detector means 64 to its forward counting mode of operation; and reset output terminal 76 is coupled to input terminal 82 of AND gate 84 to initiate operation of the error detector means 64 to its reverse counting mode of operation.

The error detector means 64 which functions as a bidirectional counter supports seven stages of flip-flops 86, 88, 90, 92, 94, 96 and 98—the last stage being an error direction control means. Each stage can be a bistable network which is similar to the flip-flop disclosed in FIG. 4 and described below. The set terminal 100 of stage 86 is coupled to feed a signal to input terminal 102 of AND gate 80; and reset terminal 104 is coupled to feed a signal to input terminal 106 of AND gate 84.

The output terminal 108 of AND gate 80 is coupled to feed a signal to an input terminal 110 of AND gate 112, and also through an OR gate 114 to the set 116 and reset 118 input terminal of flip-flop 88. The output terminal 120 of AND gate 84 is coupled to feed a signal to an input terminal 122 of AND gate 124, and also through OR gate 114 to the set 116 and reset 118 input terminals of flip-flop 88. The set output terminal 126 of flip-flop 88 is coupled to input terminal 128 of AND gate 112, and the reset output terminal 130 of flip-flop 88 is coupled to input terminal 132 of AND gate 124. Continuing, the connections to all succeeding stages 90, 92, 94, 96 and 98 are similar to the connection to stage 88 just described and, therefore, further description of the interstage connections would only be repetitious and is not thought to be necessary.

In the error detector means 64 two buffer networks 132, 134 are positioned between the stages 90 and 92. These buffer networks compensate for undesired deterioration of the signal being fed through the error detector means.

The set 136 and reset 138 input terminals of the last stage of the error detector means are coupled to receive signals from stage 96 through the AND gates 140, 142 and the OR gate 144.

The clock input terminal of each stage 86, 88, 90, 92, 94, 96, and 98 are coupled to receive pulse signals from the clock pulse shaper 12.

The reset output terminal 146 of stage 98 is coupled to feed a signal to an input terminal 148 of AND gate 150 having an output terminal 152 coupled to an input terminal of OR gate 46.

The line signals received and which contain both spacing and marking pulse signals are detected by and fed through a buffer network 154 and a line transition detector 156 to the set input terminal 158 of a count period means 160 which can be a bistable network similar to the flip-flop disclosed in FIG. 4 and described below. The set output terminal 162 of the count period means initiates or controls the count period duration and is coupled to feed a signal simultaneously to the set and reset input terminals of stage 86, the input terminal 164 of AND gate 80, the input terminal 166 of AND gate 84, and the input terminal 168 of AND gate 170. The output terminal of the buffer 154 is coupled to feed a signal to the other input terminal 172 of AND gate 170. The output terminal of AND gate 170 is coupled to feed a signal to an error corrector means 174. The error corrector means 174 can be a bistable network similar to the flip-flop disclosed in FIG. 4 and described below. In that instance where the error corrector means is a bistable network, the set input terminal 176 is coupled to receive signals from the output terminal of AND gate 170 and the reset input terminal is connected to receive clock pulse signals from the clock pulse shaper 12.

The set output terminal 182 of the error corrector means 174 is coupled to the input terminal 181 of AND gate 150; and the reset output terminal 183 of the error corrector means 174 is coupled to feed the set 184 and reset 186 input terminals of the stage 14.

The reset terminal 183 is also coupled through a reset means 188 to the reset output terminal of each stage 86, 88, 90, 92, 94, 96, and 98.

The reset means 188 supports a reset driver 190 and an OR gate 192.

With reference to FIG. 4 there is illustrated in schematic form a bistable network of the Eccles-Jordan type of flip-flop network which can be utilized for each stage 14, 16, 18, 20, 22, 24, 26 of the corrector means; for each stage 86, 88, 90, 92, 94, 96, 98 of the error detector means; for the error corrector means 174; for the count direction control means 62; and for the count period means 160.

A PNP type of transistor 200 supports an emitter terminal 202, a collector terminal 204, and a base terminal 206. The emitter terminal 202 is connected to a ground terminal and the collector terminal 204 is connected to the set output terminal 208. A resistor 210 is interposed between an eighteen volt source of negative potential and the collector terminal 204; and a crystal diode 212 is interposed between a six volt source of negative potential and the collector terminal 204. An eighteen volt source of positive potential is coupled through a resistor 214 to the base terminal 206; and an eighteen volt source of negative potential is coupled through the series combination of a resistor 216 and a capacitor 218 to the base terminal 206. A set input terminal 220 is coupled through a crystal diode 222 to the terminal common to the resistor 216 and the capacitor 218. A clock pulse terminal 224 is coupled to the base terminal 206 of transistor 200 through the series combination of crystal diodes 226, 228 connected in series with the parallel combination of a resistor 230 and a capacitor 232.

In a similar manner, a PNP type of transistor 234 supports an emitter terminal 236, a collector terminal 238, and a base terminal 240. The emitter terminal 236 is connected to a ground terminal and the collector terminal 238 is connected to the reset output terminal 242. A resistor 244 is interposed between an eighteen volt source of negative potential and the collector terminal 238; and a crystal diode 246 is interposed between a six volt source of negative potential and the collector terminal 238. An eighteen volt source of positive potential is coupled through a resistor 248 to the base terminal 240; and an eighteen volt source of negative potential is coupled through the series combination of a resistor 250 and a capacitor 252 to the base terminal 240. A reset input terminal 254 is coupled through a crystal diode 256 to the terminal common to the resistor 250 and the capacitor 252. The clock pulse terminal 224 is also coupled to the base terminal 240 of transistor 234 through crystal diodes 228, 260 connected in series with each other and with the parallel combination of a resistor 262 and a capacitor 264. The junction common to the diodes 226, 228 is connected to the junction common to the resistor 216 and capacitor 218; and the junction common to the diodes 258, 260 is connected to the junction common to the resistor 250 and the capacitor 252. The terminal common to the diode 260 and the parallel combination of the resistor 262 and the capacitor 264 is connected to the set output terminal 208; and the terminal common to the diode 228 and the parallel combination of the resistor 230 and the capacitor 232 is connected to the reset output terminal 242.

In operation, the bistable network disclosed in FIG. 4 and described above can be urged, by triggering signals, to assume a desired one of three distinct modes of operation further identified as follows: (A) Self-steering; (B) Self-steering with Inhibitor action; and (C) External steering.

The first mode of operation, Self-steering is identical to standard flip-flop operation wherein the network switches alternately from its set state to its reset state in response to successive clock pulse signals fed to the clock pulse input terminal. Thus, it can be stated that successive input clock pulse signals fed to the clock pulse input terminal are automatically "steered" alternately to the set and reset transistors. In this mode of operation the set input terminal 220 and the reset input terminal 254 are each left unconnected to prevent the occurrence of signals on these terminals from influencing the operation of the network.

In the second mode of operation, Self-steering with inhibitor action the circuit fed by the set input terminal 220 and the circuit fed by the reset input terminal 254 are each employed as inhibitor gates. Application of ground potential to set input terminal 220 and to reset input terminal 254 blocks further activation of the network by means of a clock pulse signal applied to terminal 224. However, removal of the ground potential from either or both of the input terminals 220, 254 conditions the network to permit the next appearing clock pulse signal to activate or trigger the network. This mode of operation utilizes inhibitor-gate action whereby detection of the transition of one diode from a nonconductive to a conductive state can be selectively blocked by maintaining a second diode coupled in parallel with the first diode in a continuous state of conduction during the transition period of the first diode.

Actually, this mode of operation can be considered to be composed of two sub-modes of operation. The effect of the presence of clock pulse signals on the clock pulse terminal 224 can be controlled by the signals fed to the set input terminal 220 and the reset input terminal 254 to block completely or intermittently, or to permit the continuous operation of the network in either its set or reset condition. Thus, briefly, self-steering action of the clock pulse signals in this mode of operation is similar to that of the first mode of operation, however, the effect of the presence of the clock pulse signals can be blocked selectively.

In the third mode of operation—External steering, clock pulse signals are not employed. In this mode of operation the clock pulse terminal 224 is left open—clock pulse signals are not fed to it, and the network is driven selectively to either its set or reset state by the application of a pulse signal to the appropriate set input terminal 220 or the reset input terminal 254. The network, after having been driven to a selected state, will remain in that state until a pulse signal is fed to the other input terminal—however, successive pulse signals fed to the same input terminal will have no effect on the condition of the network or its output signals.

In operation, the second and third modes of operation are essentially supplemental to the first mode of operation. Therefore, to simplify the explanation of the detailed operation of the network of FIG. 4, the explanation which follows will assume operation in the first mode.

Proceeding, with reference to FIG. 4, it shall be assumed that the network is initially in the reset state—transistor 200 is conductive, transistor 234 is nonconductive, and a negative potential is present on the reset output terminal 242. In the period between clock pulses, the clock pulse input terminal 224 will be maintained at ground potential and, since first mode operation has been assumed, the set input terminal 220 and reset input terminal 254 will not have any effect on the network. During this period the negative potential of six volts is fed through the diode 246 and the resistor 244 to the negative potential of eighteen volts (diode 246 thus being biased in the forward direction) to feed a negative potential of six volts to the reset output terminal 242 and to the collector terminal 238 of the transistor 234. The negative potential of six volts which is present on the reset output terminal 242 is also fed to the right hand side of resistor 230 located in the base circuit of transistor 200, and the drop of potential present across the resistors 214 and 230 from the positive potential of eighteen volts to the negative potential of six volts is sufficient to maintain the base 206 of transistor 200 which is coupled to the junction common to the resistors 214 and 230 slightly negative to maintain transistor 200 in a conductor state. When the transistor 200 is in a conductive state the grounded emitter 202 attempts to hold the collector 204 and the set output terminal 208 at ground potential and, therefore, ground potential is applied to the left hand side of resistor 262 located in the base circuit of transistor 234. However, here the potential drop from the positive potential of eighteen volts to ground potential across the resistors 248, 262 attempts to maintain the base 240 of transistor 234 which is coupled to the junction common to the resistors 262 and 248 slightly positive to maintain transistor 234 in a nonconductive state.

Proceeding with the examination of the network of FIG. 4, during the interval between clock pulses it will be observed that a ground potential fed to the clock pulse terminal 224 will be applied to the source of eighteen volt negative potential through the series combination of the forward biased diode 226 and resistor 216 coupled in parallel with the series combination of the forward biased diode 258 and resistor 250 to hold the lower terminals of capacitors 218 and 252 and the cathode terminals of crystal diodes 228 and 260 at ground potential. At this instant the anode terminal of diode 228 will be at the same negative potential as the reset output terminal 242, and the anode terminal of diode 260 will be at the same potential (ground) as the set output terminal 208. At this instant the diode 228 will be biased in the reverse direction and will be nonconductive, and diode 260 will be coupled to ground potential at each of its terminals and will pass a very small ground current through resistor 250 to the source of negative potential of eighteen volts. The upper terminal of capacitor 218 is coupled to the base terminal 206 of transistor 200 and will display a potential which corresponds to the potential differential between the base terminal 206 and ground. The upper terminal of capacitor 252 is coupled to the base terminal 240 of transistor 234 and will display a potential which corresponds to the potential differential between the base terminal 240 and ground.

Now, upon the occurrence of a clock pulse signal a negative potential is fed to the clock pulse terminal 224 and applied through diode 226 and resistor 216 to the source of negative potential of eighteen volts, and the potential on the lower terminal of capacitor 218 is reduced to the magnitude of the negative value of the clock pulse signal. However, since the upper terminal of the capacitor 218 will remain for the moment at the potential of the base terminal 206 of transistor 200, the capacitor 218 will assume a charge which will correspond to the difference between the two potentials with the upper terminal being positive with respect to the lower terminal.

The negative clock pulse signal drives diode 258 to its nonconductive state because diode 260 continues to pass current through resistor 250 to the source of negative potential of eighteen volts, and the lower terminal of capacitor 252 will be maintained at ground potential and the very slight charge on capacitor 252 will remain unchanged.

The negative potential present at the clock pulse terminal 224 returns to ground level at the termination of the clock pulse signal to again effectively clamp to ground the lower terminal of capacitor 218. At this instant the capacitor 218 is discharged and the upper-positive terminal of capacitor 218 momentarily raises the base 206 of transistor 200 to a positive potential which corresponds in magnitude to the charge assumed by the capacitor. This positive potential fed to the base of the transistor 200 drives the transistor to a nonconductive state which permits the collector terminal 204 and set output terminal 208 to assume a six volt negative potential through the application of the potential from the source of negative six volts fed through diode 212, and resistor 210 to the source of eighteen volts negative potential.

The left hand terminal of resistor 262 which is coupled to the set output terminal 208 will also be coupled to the negative six volts potential and the electrical path formed between the negative six volts and the positive eighteen volts by resistor 262 and resistor 248 will lower the value of the potential at the base terminal 240 of transistor 234 to a very small negative potential which is sufficient to drive the transistor 234 to its conductive state. When the transistor 234 is driven to its conductive state it will apply ground potential to its collector terminal 238 and, therefore, to the reset output terminal 242, which raises the potential on the base terminal 206 of transistor 200 to a very small positive value which maintains transistor 200 in its nonconductive state.

At this instant in the description, the bistable or flipflop network has changed from its reset to set state presenting one-half of a cycle of operation.

Now, in the operation of this bistable network in its second mode of operation—self-steering with inhibitor action, negative potential square wave pulse signals having durations which are at least slightly longer than the durations of the clock pulse signals and which vary in magnitude from a base of ground potential to a negative potential which is equal to that of the clock pulse signals are fed to either one or both of the set and reset input terminals 220, 254 at the same time that a clock pulse signal is fed to the clock pulse terminal 224. It is here indicated that the wave shape of the signal fed to the set and/or reset input terminals is not critical and satisfactory operation can be obtained with wave shapes which are other than square in shape. Application of a ground potential to the set and/or reset input terminals 220, 254 permits the associated diodes 222 and/or 256 to be biased to the conductive state by the source of eighteen volt negative potential fed to the resistors 216, 250; and the lower terminals of the associated capacitors 218 and/or 252 will be maintained at ground potential regardless of the presence or absence of clock pulse signals at the clock pulse terminal 224. Thus, the clock pulse signals fed to the clock pulse terminal 224 are effective and can trigger the transistors of the bistable network only at those intervals when the set and/or reset input circuits are in an "opened" condition by the presence of a negative potential applied to the set and/or reset input terminals 220, 250 to drive diodes 222 and/or 256 to the nonconductive state.

Application of a ground potential signal to the set input terminal 220 and the reset input terminal 254 simultaneously will prevent the bistable network from switching in either direction on application of a clock pulse input to terminal 224. However, application of a ground potential signal to the set input terminal 220 will prevent the bistable network from switching to the set condition and, in a like manner, application of a ground potential signal to the reset input terminal 254 will prevent the bistable network from switching to the reset condition. Continuing, if the bistable network is in its reset state and a ground potential is fed to the set input terminal 220 at the same instant that a clock pulse signal is fed to terminal 224—the bistable network will not change its state of operation but will remain in its reset state. However, if the bistable network is in its set state and a negative potential is fed to the set input terminal 220 at the same instant that a clock pulse signal is fed to terminal 224 then the bistable network will change its state of operation and will assume the reset state. Application of a negative potential signal to the reset input terminal 254 will condition the bistable network to operate in the manner described above with respect to the reset state instead of the set state.

The third mode of operation—external steering, the set and reset input terminals 220, 254 are used to trigger the bistable network, clock pulse signals are not employed and, therefore, the clock pulse terminal 224 is left in an unconnected condition. Thus, the diodes 226 and 258 are not utilized and have no effect on the operation of the network. In this mode of operation trigger pulse signals which are similar to the clock pulse signals distributed above are fed to either the set input terminal 220 or the reset input terminal 254, the terminal selected determines the direction in which the network will be driven. However, once the network has assumed a given state, further application of trigger pulse signals to that input terminal will not have any further effect on the output conditions unless a trigger pulse signal is first fed to the other input terminal. Continuing, in operation, if the set transistor 200 is initially in its nonconductive state—the bistable network, being in its set condition—and a trigger pulse signal is fed to the set input terminal 220, then the resulting charge on capacitor 218 will momentarily drive the base terminal 206 of transistor 200 to a more positive condition and, therefore, would drive transistor 200 further into its nonconductive state. However, if a trigger pulse signal were fed to the reset input terminal 254, then the bistable network would assume its other conductive state and set transistor 200 would become conductive while reset transistor 234 would become nonconductive.

Examination of the bistable network illustrated in FIG. 4 will disclose an output clamping circuit which comprises the diodes 212, 246 and the source of six volt negative potential. Without this combination the magnitude of the output signal of the network would be determined by the magnitude of the potential which appears across the resistors 210, 244. In this instance, a negative potential of eighteen volts. The clamping circuit improves the configuration of the negative-going transitions of the output signals of the bistable network by clamping promptly the negative potential of the output signal at a negative potential of six volts as the bistable network transistors switch from their conductive to nonconductive states.

Returning now to the block diagrams illustrated in FIGS. 1 and 2, in the corrector means stages 14 and 16 are bistable networks similar to that illustrated in FIG. 4 and coupled to operate in the second mode of operation—self steering with inhibitor action; and stages 18, 20, 22, 24 and 26 are bistable networks as disclosed in FIG. 4 coupled to operate in the first mode of operation—Self Steering. The Error Corrector Means 174 and the count period means are bistable networks similar to that illustrated in FIG. 4 and coupled to operate in the third mode of operation—external steering, clock pulse signals not being employed. The count direction control means 62 is a bistable network similar to that illustrated in FIG. 4 and coupled to operate in the second mode of operation. In the Error detector means 64 each stage 86, 88, 90, 92, 94, and 96, and the Error direction control means 98 are each bistable networks similar to that illustrated in FIG. 4 and coupled to operate in the second mode of operation.

With reference to the operation of the structure of this invention as disclosed in FIGS. 1 and 2 there is illustrated a first chain of flip-flop or bistable network stages referred to as corrector means 28, and a second chain of flip-flops or bistable networks referred to as Error detector means 64. The Error detector means 64 is coupled to the corrector means 28 through auxiliary flip-flop and gate circuits, and a source of clock pulse signals is coupled to drive the system. The corrector means 28 functions as a binary counter capable of indicating the occurrence of 128 clock pulse signals before being recycled. The error detector means functions as a reversible binary counter capable of indicating the occurrence of 128 clock pulse signals before recycling occurs when operating in any one direction. Thus, with each means, the corrector means 28 and the error detector means 64 only sixty-four clock pulse signals are required to trigger the last stage to its other state. The frequency of the signals from the source of clock pulse signals is set at exactly 128 times the bit frequency of the line signals being received. Therefore, since the seventh stage 26 of the corrector means 28 will change its state of conduction only after 64 clock pulse signals have been fed to the corrector means 28, the seven-stage corrector means 28 which is driven directly by clock pulse signals from the source of clock pulse signals generates square wave pulse signals at the output terminal of the last stage which is 1/128 that of the clock pulse frequency and is exactly equal to the bit frequency.

The square wave output signal of the last stage 26 of the corrector means 28 generates one positive going transition for each occurring line signal bit, and it is these transitions which are utilized as probe pulse signals to synchronize the operation of auxiliary equipment which detect the presence or bits in the line signal.

It is here, again observed that while the corrector means 28 and the error detector means 64 each perform separate and distinct functions—the standard or universal flip-flop or bistable network illustrated in FIG. 4 and described above is used throughout—the mode of operation desired being obtained by the proper selection of the input and output terminals. The set output terminal of the flip-flops indicated by means of an "S" display a negative potential, and the reset output terminal of the flip-flops indicated by means of an R display a ground potential when the flip-flop network is in its set condition or state. Naturally when the flip-flop network is in its reset condition or state the output signals are reversed and a ground potential appears on the set terminal and a negative potential appears on the reset terminal. Furthermore, in accordance with the clock pulse logic as used in this invention the positive-going transitions of all signals are utilized to perform the actual triggering of the flip-flop networks—that is, a signal which approaches a ground potential from an initial negative potential will attempt to trigger the flip-flop networks. Additionally, in this invention all signals assume either a negative potential or a ground potential and are essentially rectangular in shape. The signal from the line transition detector 156, and the signal from the reset driver 190 are positive-going spikes generated from signal transitions. The use of generated spikes in these two instances is dictated by the need to avoid subsequent blocking of the flip-flop network being driven; blocking being characterized by the situation where a first triggering pulse signal continues to occur during a time interval which would conflict with a second triggering pulse signal intended to change the state of the flip-flop.

Figure 3:
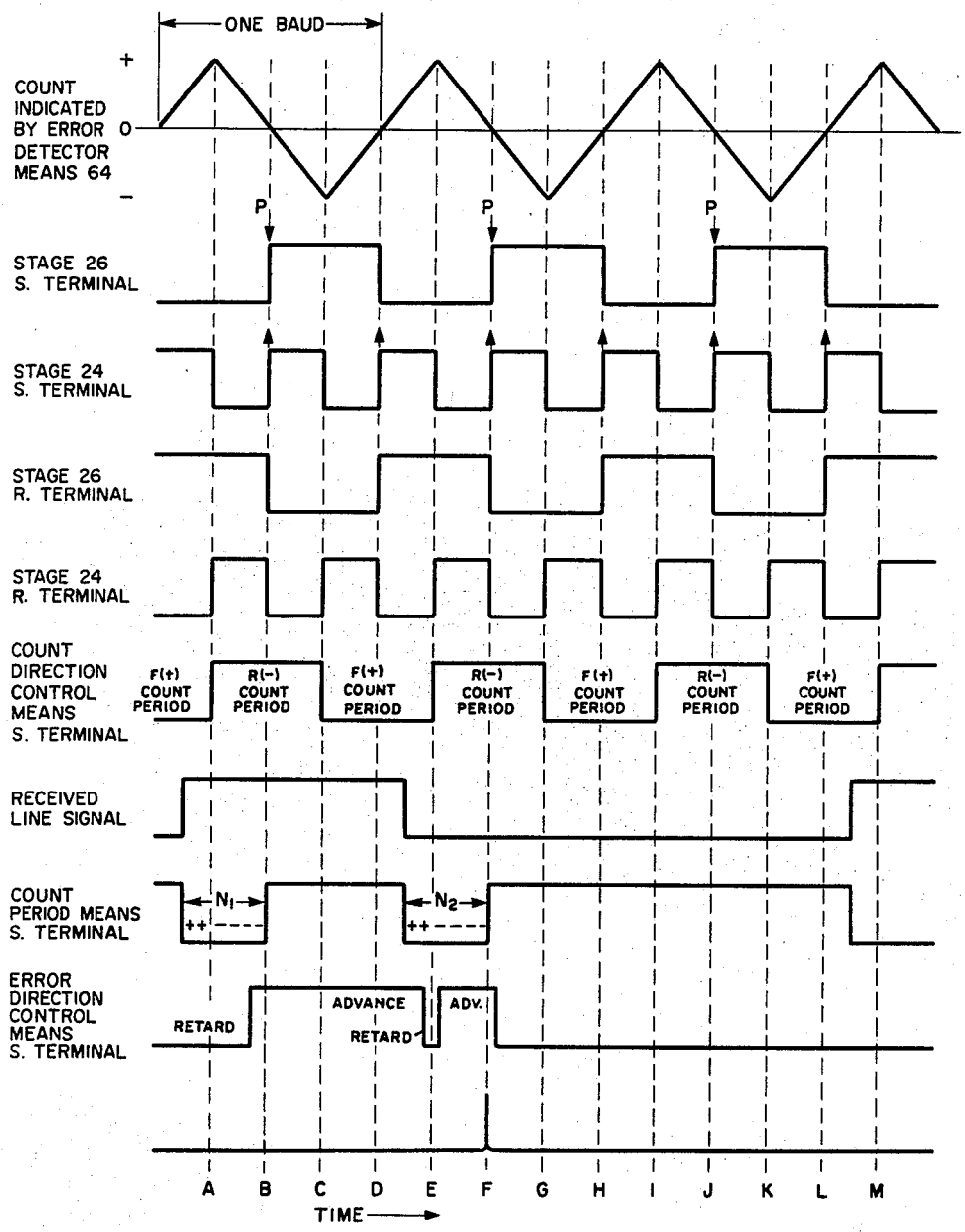
FIG. 3 is a graph of wave forms present in the structure of this invention.

Returning to the FIGS. 1 and 2, and with reference to FIG. 3 which is a graph of wave forms present during the operation of this invention—at a time interval immediately after the occurrence of a probe pulse signal when the line is in a marking condition (the probe pulse signals second and third from the left on wave form for Stage 26–S terminal and further identified as occurring at time F), all seven stages 86, 88, 90, 92, 94, 96, and 98 of the error detector means 64 are in the set condition (a negative potential is present on the set (s) terminal) and the count period means 160 is in its reset or "stop" condition (a negative potential is present on the reset (R) terminal). At this instant the corrector means 28 which is stepped continuously by the clock pulse signals from the clock pulse shaper 12 is just starting a new cycle—all of the flip-flop stages having been driven to their reset state by the last occurring clock pulse. At the count of 32 the flip-flop 24 will be driven to its set state, and at the count of 64 the flip-flop 26 will be driven to its set state. The error detector means 64 which is also coupled to receive the clock pulse signals is held in an inoperative state by the application of a ground potential which is fed from the set output terminal of the count period means to the set and reset input terminals of the first stage 86 and to each of the AND gates 80, 84.

All line signals, both spacing and marking are fed to the buffer 154. It shall now be assumed that the next appearing line signal is a spacing signal. This spacing signal is fed through the buffer 154 to the line transition detector 156 which generates a positive going trigger pulse signal at its output terminal. The line transition detector is a differentiator and an inverter in combination, and generates positive-going trigger spike signals for both negative and positive going line signal transitions. Thus, it could be stated that each instant the signal present on the line changes from a spacing signal to a marking signal or from a marking signal to a spacing signal a positive trigger spike signal is generated by the line transition detector 156. The trigger signal from the detector 156 is fed to the set input terminal of the count period means 160 to drive it to its set state—and a negative potential signal is fed to the set and reset input leads of the stage 86 and is also fed to an input terminal of each of the AND gates 80, 84.

Energization of the set and reset input leads of the stage 86 permits the next occurring clock pulse signal to drive the stage 86 to its other state of conduction—and it is at this instant that the error detector means 64 starts to count. The error detector means 64 is a bidirectional counter and the direction in which it first starts to count is determined by the count direction control means 62.

The presence of a negative potential on the set output terminal 74 of means 62 will condition the error detector means to count in a forward direction, and the presence of a negative potential on the reset output terminal 76 will condition the error detector means to count in a reverse direction. The direction in which the error detector means 64 will count with the occurrence of clock pulse signals is indicated on the curve for the count direction control means 62–S terminal in FIG. 3 by means of + and − signs. The count direction control means 62 is fed by the set and reset output terminals of the stage 26 and by the reset terminal of stage 24 of the corrector means 28 to generate a square wave signal on its set output terminal 74 which is identical to but leads by 90 degrees the probe pulse signals generated on the set output terminal of stage 26. Thus, the count direction control means assumes a reset state 90 degrees in advance of each probe pulse and a set state 90 degrees behind each probe pulse. This relationship of the output signals of the count direction control means 62 relative to the probe pulse signals generated by the stage 26 of the corrector means 28 is illustrated in FIG. 3.

At the interval when the count direction control means 62 is in its set state a negative potential signal is fed from the set output terminal 74 to the AND gate 80, and this signal in combination with the negative potential signal from the set output terminal 162 of the count period means 160 primes the AND gate 80 to permit the error detector means 64 to count in a forward direction. In a similar manner, when the count direction control means is in its reset state the negative potential present on its reset output terminal 76 cooperates with the negative potential signal present on the set output terminal 162 of the count period means 160 to prime the AND gate 84, and the error detector means 64 is conditioned to count in a reverse direction. Positioned between the stages 90 and 92 of the error detector means 64 are two buffer networks 132, 134. These buffer stages do not effect the operation of the error detector means 64, they merely compensate for deterioration of the signal caused by diodes present in the series coupled AND gates.

Initially, prior to the priming of the stage 86 by the application of a negative pulse signal from the set output terminal of the count period means 160 to the set and reset input terminals of stage 86, each stage 86, 88, 90, 92, 94, 96, and 98 is in a set condition or state, and this is the initial or zero condition of the error detector means. Thus, each stage in the error detector means 64 is driven to its set state prior to the counting of clock pulse signals. Now, immediately after the count direction control means 62 and the count period means 160 each have been driven to a set condition (the occurrence of a negative potential signal on the set output terminal) the next appearing clock pulse signal fed to the error detector means 64 will drive each stage 86, 88, 90, 92, 94, 96, and 98 simultaneously from a set state to a reset state. The very next appearing or second clock pulse signal will affect only the first stage 86 because, at this instance, the signal fed from the set output terminal of stage 86 to the AND gate is at ground potential and, therefore, the AND gate 80 blocks the feeding of negative potential signals to the set 116 and reset 118 input terminals of the next appearing stage 88.

Thus, immediately after each stage of the error detector means 64 has been driven from a set condition to a reset condition—or immediately after the occurrence of the first clock pulse signal after the error detector means 64 has been enabled to count in a forward direction— the error detector means 64 counts in a positive direction from left to right in the manner similar to that of a standard binary counter. When operating in the forward direction binary zero is represented by driving a stage to its reset state and binary one is represented by driving a stage to its set state. Furthermore, when the count direction control means 62 is driven to assume its reset state, then a negative potential signal will be fed from the reset output terminal 76 to enable or prime the AND gate 84 and the error detector means 64 will then operate according to reverse logic—that being that when a stage is in its set state it will now be the equivalent of binary zero instead of binary one, and that when the stage is in its reset state it will be the equivalent of binary one instead of binary zero. Accordingly, when the error detector means 64 is conditioned to count in a reverse direction after having counted in a forward direction it will pass in succession through each of the positions assumed during the forward count but in reverse time sequence. If, however, the reverse count interval is greater than the forward count interval then the error detector means 64 will pass through the initial condition and continue to count in a reverse direction. In this invention the error detector means 64 is in its initial state when each stage simultaneously is in a set state.

At this instant it should be noted that the last stage 98 functions as an error direction control means; the error of the occurrence of the probe pulse signal relative to the line signal being in a leading direction if stage 98 is in one stage, and the error being in a lagging direction if stage 98 is in its other state.

Operation of the error detector means 64 continues in the appropriate direction until the bistable network 160 is driven to its reset state by a positive-going transition of the signal from the set terminal of stage 24 in the corrector means 28. This signal, which is in phase with the probe pulse signals but is of twice its frequency, stops the operation of the error detector means 64 either on a probe pulse signal or at a point positioned midway between two probe pulse signal, depending upon which condition occurs first. An examination of the wave form from the set output terminal of stage 24 with the error detector means response curve (the third and first appearing waveshapes from the top of FIG. 3) will indicate that the whole periods between stop pulse signals of the waveshape from the set output terminal of stage 24 (occurring at time intervals B, D, F, H, and so on) correspond to periods of exactly one-half negative and one-half positive count direction and, therefore, count information is not lost by not counting during these periods since the first half count would only be cancelled by the second half count.

After the error detector means 64 is first stopped following the initial count at the beginning of a line signal, it is restarted and stopped in the same manner for a second count interval at the end of the line signal. Thus, for each line signal there are two count periods——one for the positive going transition of the line signal and another for the negative going transition of the line signal. The necessity of two count periods instead of one will be explained at the conclusion of this explanation of the operation of the invention.

At the end of the second count interval the error direction control means 98, the last stage of the error detector means 64, indicates whether the total count was a positive number or a negative number—the sign of the number being indicated by the state assumed by the stage 98. If the final count is a positive number—that is that the total positive count was greater than the total negative count, then at the end of the second count interval the stage 98 will be in its set state. If, however, the negative count was greater than the positive count, then a negative number would have been obtained and stage 98 will be in its reset state.

The structure of this invention will always indicate either a positive or a negative error because the stage 98 can assume only two states, a set state and a reset state. Therefore, in this invention the indication for the occurrence of a "no correction required condition" is the same as the indication for a negative error.

With reference to the waveforms illustrated in FIG. 3, it will be noted that a negative count indicates that the probe pulse signals are advanced relative to their proper position, and that a positive count indicates that the probe pulse signals are retarded relative to their proper position.

The corrector means 28 is driven by the error direction control means 98 to either retard or advance the time occurrence of the probe pulse signal. Thus, if the stage 98 is in its set state which indicates a negative count or that the probe pulse signals lead their proper position then the corrector means 28 is driven by the stage 98 to retard the time of occurrence of the next occurring probe pulse signal. In a like manner, if the stage 98 is in its reset state which indicates a positive count or that the probe pulse signals lag their proper position then the corrector means 28 is driven by the stage 98 to advance the time of occurrence of the next occurring probe pulse signal.

The corrector means 28 is driven continuously by clock pulse signals fed from the source of clock pulse signals 10 through the clock pulse shaper 12. However, since the corrector means 28 is composed of seven bistable networks coupled together to function as a binary counter, one hundred and twenty eight clock pulse signals must be fed to the first stage 14 to cause the last stage 26 to cycle once. The probe pulse signals are identified as the positive going pulse signals which appear on the set output terminal of the stage 26. Therefore starting from the generation of a probe pulse signal, one hundred and twenty eight clock pulse signals are required to generate the next appearing probe pulse signal. The phase or time occurrence of the probe pulse signals are controlled by the error direction control means and is advanced or retarded a time duration equal to $\frac{1}{128}$ of its cycle or one clock pulse signal. The phase of the corrector means 28 is controlled directly by the Error corrector means 174 which, being driven continuously by the application of clock pulse signals fed to its reset input terminal attempts to remain in its reset state or retard position. When the bistable network 174 is in its retard position it permits the normal operation of the corrector means through the enabled AND gate 38. However, the set input terminal 176 of the Error corrector means 174 is fed through the two input AND gates 170 by line signals which appear at the output of the buffer 154 and by the signals which appear on the set output terminal 162 of the count period means 160. Comparison of the line signals with the wave form on the set output terminal 162 of the count period means or bistable network 160 (FIG. 3) illustrates that these two signals, in combination, vary from a negative condition to a positive-negative condition only once for each occurrence of a line signal; this transition occurring at the end of the second count interval when there is a marking (negative) signal present on the line and the bistable network 160 is driven from a set (count) condition to a reset (stop) condition. This positive-going transition is fed through the AND gate 170 to the set input terminal of the bistable network 174. The network 174 is driven momentarily to its set state and as the potential signal on its reset output terminal goes from negative potential to ground potential this positive-going pulse signal is fed from the reset output terminals 183 to the set and reset input terminals 184, 186 of stage 14 to block the triggering of stage 14 by the next appearing clock pulse signal. Thus, in this manner the application of a clock pulse signal to the corrector means 28 has been blocked and, in effect, the generation of the probe pulse signal which appears at the set output terminal of stage 26 has been delayed a time duration which corresponds to the length of one clock pulse signal—a time duration equivalent to $\frac{1}{128}$th of the frequency of the probe pulse signal.

The rate of correction at which the position of the probe pulse signals are either advanced or retarded is $\frac{1}{128}$th of a probe pulse signal cycle as only one step correction is made, either forward or backward, for each received line signal regardless of the total actual error present. The time increment of $\frac{1}{128}$th of the probe pulse signal was chosen because this time duration appears to be most adaptable to satisfying the requirements of counter design, accuracy of alignment, and speed of correction.

It should be noticed that the above-described retarding effect will occur at the end of every second count interval regardless of the final condition of the error direction control means 98. This method of operation was chosen for its economy in cost and reliability in operation. To compensate for the retarding effect when the time occurrence of a probe pulse signal must be advanced as indicated by the occurrence of a positive error count, the presence of a negative signal on the reset output terminal of the bistable network 98, the corrector means 28 is advanced two steps as it is simultaneously retarded one step thus producing a total change of one step forward, and the occurrence of the probe pulse signal will be advanced $\frac{1}{128}$th of its cycle.

A simple binary counter can be advanced two steps by altering directly the second stage of the counter—the first stage being left unaltered. This is exactly what is accomplished by means of the advance AND gate 150. Through this AND gate there is fed, in combination, directly to the set and reset input terminals of the bistable network the negative potential signal which is present on the set output terminal of the bistable network 174 and the negative potential signal present on the reset output terminal of the bistable network 98. Now, if the error direction control means 98 is in its reset state (which indicates a positive error count) at the termination of its total count interval, a negative potential signal will be fed from its reset output terminal to the input terminal 148 to enable AND gate 150. At the instant that the Error corrector means 174 transfers from its set to its reset state and generates the corrector means retard pulse signal, the advance AND gate 150 enabled by the stage 98 also passes a negative potential from bistable network 174 to permit the stage 16 to be driven to its other state to effectively advance the corrector means one clock pulse position. The next occurring clock pulse signal, that clock pulse signal which follows immediately the triggering of the Error corrector means 174 to its set state occurs while the set and reset input terminals 184, 186 of stage 14 are maintained at ground potential by the reset output terminal of bistable network 174 and while the set and reset input terminals 48, 50 of stage 16 are maintained at a negative potential through the enabled AND gate 150 coupled in series with the OR gate 46. Therefore, stage 16 will be triggered to assume its other state by the directly applied clock pulse signal. However, the triggering of stage 14 will be blocked and its state will not be altered; and the corrector means 28 will assume a condition which corresponds to a jump of one position ahead of its normal position for that received clock pulse signal.

At the same instant that the bistable network 174 is driven from its reset state to its set state for the retard/advance cycle, the positive-going transition of the signal present on the reset output terminal of network 174 is fed to the reset driver 190. A positive-going reset trigger pulse signal is generated by the driver 190, and is fed to the reset gate 192 to cause the reset OR gate 192 to render common, at ground potential, the reset output terminals of each stage 86, 88, 90, 92, 94, 96, and 98 momentarily to urge each stage to assume a set state at the next clock pulse signal. At this instant the error detector means 64 is in its initial or zero condition—that being when each stage is in its set state.

It is to be noted that the single clock pulse signal which is utilized to effect the required advance or retard effect of the corrector means 28 is also utilized to drive the error detector means 64 to its initial condition.

Thus, immediately after the occurrence of a correction procedure the structure of this invention is conditioned to receive and examine a next appearing line signal.

Figure 5:
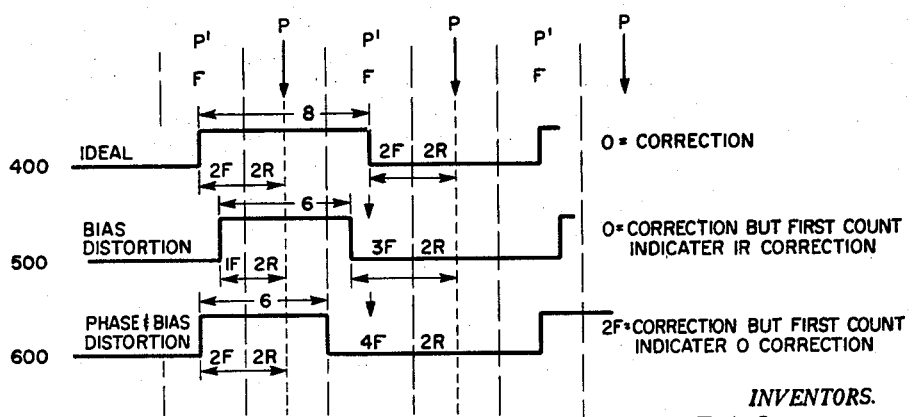
FIG. 5 illustrates the effect of distortion on the line signals.

With reference to FIG. 5, there is illustrated the effect of distortion on line signals and, in simplified form, the necessity that two count periods be utilized to determine accurately phase error between line signals and probe signals.

In FIG. 5 the position of the probe pulse signals is indicated by the dotted vertical lines P, and the direction of count is indicated by "F" for forward and "R" for reverse. The forward and reverse count cycles are separated by vertical dash lines.

The graph 400 illustrates the ideal condition where the probe pulse signals P are centered relative to the line signals. Here it will be observed that the first count period consists of two units forward and two units reverse; and that the second count period consists of two units forward and two units reverse. Adding the first count period to the second count period produces a total of zero—an indication that the probe pulse signal is positioned properly.

However, graph 500 illustrates the effect of bias on the received line signal. In this instance the first count period consists of one unit forward and two units reverse; and the second count period consists of three units forward and two units reverse. Addition of the first count period to the second count period produces a total of zero—an accurate indication that the probe pulse signal is positioned properly. But—if only the first count period were considered, the second count period being ignored, then there would be a resultant count of one reverse—an inaccurate indication that an error exists. In this last instance the properly positioned probe pulse signal would be urged to assume an improper position.

Continuing, graph 600 illustrates a wave form which can be obtained when both phase and bias distortion are present. In this instance the first count period only would indicate that a correction is not necessary, an erroneous conclusion. However, the two count periods when added together do indicate accurately that an error is present and that a correction is required to properly position the probe pulse signal relative to the line signals.

Obviously many modifications and variations of the present invention are possible in the light of the above teachings. It is therefore to be understood that within the scope of the appended claims the invention may be practiced otherwise than is specifically described.

What is claimed is:

1. A synchronous adapter comprising a source of clock pulse signals, a corrector means fed by said source of clock pulse signals to generate probe pulse signals, an error detector means having a forward mode of operation and a reverse mode of operation, an input means energized by received line signals to couple selectively said error detector means to said source of clock pulse signals, a count direction control means fed by said corrector means coupled to condition said error detector means to its forward mode of operation or its reverse mode of operation, and an error corrector means fed by said source of clock pulse signals and said input means coupled to block a signal fed from said source of clock pulse signals to said corrector means to retard the occurrence of a probe pulse signal and to feed selectively a signal from the error detector means to said corrector means to advance the occurrence of a probe pulse signal.

2. A synchronous adapter comprising a source of clock pulse signals, a binary adder fed by said source of clock pulse signals to generate probe pulse signals, an error detector means having a forward mode of operation and a reverse mode of operation, an input means energized by received line signals to couple selectively said error detector means to said source of clock pulse signals, a count direction control means fed by said corrector means coupled to condition said error detector means to its forward mode of operation or its reverse mode of operation, and an error corrector means fed by said source of clock pulse signals and said input means coupled to block a signal fed from said source of clock pulse signals to said binary adder to retard the occurrence of a probe pulse signal and to feed selectively a signal from the error detector means to said binary adder to advance the occurrence of a probe pulse signal.

3. A synchronous adapter comprising a source of clock pulse signals, a unidirectional binary adder fed by said source of clock pulse signals to generate probe pulse signals, an error detector means having a forward mode of operation and a reverse mode of operation, an input means energized by received line signals to couple selectively said error detector means to said source of clock pulse signals, a count direction control means fed by said unidirectional binary adder coupled to condition said error detector means to its forward mode of operation or its reverse mode of operation, and an error corrector means fed by said source of clock pulse signals and said input means coupled to block a signal fed from said source of clock pulse signals to said unidirectional binary adder to retard the occurrence of a probe pulse signal and to feed selectively a signal from the error detector means to said unidirectional binary adder to advance the occurrence of a probe pulse signal.

4. A synchronous adapter comprising a source of clock pulse signals, a corrector means fed by said source of clock pulse signals to generate probe pulse signals, a bidirectional binary adder having a forward mode of operation and a reverse mode of operation, an input means energized by received line signals to couple selectively said bidirectional binary adder to said source of clock pulse signals, a count direction control means fed by said corrector means coupled to condition said bidirectional binary adder to its forward mode of operation or its reverse mode of operation, and an error corrector means fed by said source of clock pulse signals and said input means coupled to block a signal fed from said source of clock pulse signal to said corrector means to retard the occurrence of a probe pulse signal and to feed selectively a signal from the bidirectional binary adder to said corrector means to advance the occurrence of a probe pulse signal.

5. A synchronous adapter comprising a source of clock pulse signals, a binary adder fed by said source of clock pulse signals to generate probe pulse signals, a bidirectional binary adder having a forward mode of operation and a reverse mode of operation, an input means energized by received line signals to couple selectively said bidirectional binary adder to said source of clock pulse signals, a count direction control means fed by said binary adder coupled to condition said bidirectional binary adder to its forward mode of operation or its reverse mode of operation, and an error corrector means fed by said source of clock pulse signals and said input means coupled to block a signal fed from said source of clock pulse signals to said binary adder to retard the occurrence of a probe pulse signal and to feed selectively a signal from the error detector means to said binary adder to advance the occurrence of a probe pulse signal.

6. A synchronous adapter comprising a source of clock pulse signals, a unidirectional binary adder fed by said source of clock pulse signals to generate probe pulse signals, a bidirectional binary adder having a forward mode of operation and a reverse mode of operation, an input means energized by received line signals to couple selectively said bidirectional binary adder to said source of clock pulse signals, a count direction control means fed by said corrector means coupled to condition said bidirectional binary adder to its forward mode of operation or its reverse mode of operation, and an error corrector means fed by said source of clock pulse signals and said input means coupled to block a signal fed from said source of clock pulse signals to said unidirectional binary adder to retard the occurrence of a probe pulse signal and to feed selectively a signal from the bidirectional binary adder to said unidirectional binary adder to advance the occurrence of a probe pulse signal.

7. A synchronous adapter comprising a source of clock pulse signals, a corrector means fed by said source of clock pulse signals to generate probe pulse signals, an error detector means having a forward mode of operation and a reverse mode of operation, an input means energized by received line signals to couple selectively said error detector means to said source of clock pulse signals, a first bistable network fed by said corrector means coupled to condition said error detector means to its forward mode of operation or its reverse mode of operation, and a second bistable network fed by said source of clock pulse signals and said input means coupled to block a signal fed from said source of clock pulse signals to said corrector means to retard the occurrence of a probe pulse signal and to feed selectively a signal from the error detector means to said corrector means to advance the occurrence of a probe pulse signal.

8. A synchronous adapter comprising a source of clock pulse signals, a binary adder fed by said source of clock pulse signals to generate probe pulse signals, an error detector means having a forward mode of operation and a reverse mode of operation, an input means energized by received line signals to couple selectively said error detector means to said source of clock pulse signals, a first bistable network fed by said corrector means coupled to condition said error detector means to its forward mode of operation or its reverse mode of operation, and a second bistable network fed by said source of clock pulse signals and said input means coupled to block a signal fed from said source of clock pulse signals to said binary adder to retard the occurrence of a probe pulse signal and to feed selectively a signal from the error detector means to said binary adder to advance the occurrence of a probe pulse signal.

9. A synchronous adapter comprising a source of clock pulse signals, a unidirectional binary adder fed by said source of clock pulse signals to generate probe pulse signals, an error detector means having a forward mode of operation and a reverse mode of operation, an input means energized by received line signals to couple selectively said error detector means to said source of clock pulse signals, a first bistable network fed by said unidirectional binary adder coupled to condition said error detector means to its forward mode of operation or its reverse mode of operation, and a second bistable network fed by said source of clock pulse signals and said input means coupled to block a signal fed from said source of clock pulse signals to said unidirectional binary adder to retard the occurrence of a probe pulse signal and to feed selectively a signal from the error detector means to said unidirectional binary adder to advance the occurrence of a probe pulse signal.

10. A synchronous adapter comprising a source of clock pulse signals, a corrector means fed by said source of clock pulse signals to generate probe pulse signals, a bidirectional binary adder having a forward mode of operation and a reverse mode of operation, an input means energized by received line signals to couple selectively said bidirectional binary adder to said source of clock pulse signals, a first bistable network fed by said corrector means coupled to condition said bidirectional binary adder to its forward mode of operation or its reverse mode of operation, and a second bistable network fed by said source of clock pulse signals and said input means coupled to block a signal fed from said source of clock pulse signals to said corrector means to retard the occurrence of a probe pulse signal and to feed selectively a signal from the bidirectional binary adder to said corrector means to advance the occurrence of a probe pulse signal.

11. A synchronous adapter comprising a source of clock pulse signals, a binary adder fed by said source of clock pulse signals to generate probe pulse signals, a bidirectional binary adder having a forward mode of operation and a reverse mode of operation, an input means energized by received line signals to couple selectively said bidirectional binary adder to said source of clock pulse signals, a first bistable network fed by said binary adder coupled to condition said bidirectional binary adder to its forward mode of operation or its reverse mode of operation, and a second bistable network fed by said source of clock pulse signals and said input means coupled to block a signal fed from said source of clock pulse signals to said binary adder to retard the occurrence of a probe pulse signal and to feed selectively a signal from the bidirectional binary adder to said binary adder to advance the occurrence of a probe pulse signal.

12. A synchronous adapter comprising a source of clock pulse signals, a unidirectional binary adder fed by said source of clock pulse signals to generate probe pulse signals, a bidirectional binary adder having a forward mode of operation and a reverse mode of operation, an input means energized by received line signals to couple selectively said bidirectional binary adder to said source of clock pulse signals, a first bistable network fed by said unidirectional binary adder coupled to condition said bidirectional binary adder to its forward mode of operation or its reverse mode of operation, and a second bistable network fed by said source of clock pulse signals and said input means coupled to block a signal fed from said source of clock pulse signals to said unidirectional binary adder to retard the occurrence of a probe pulse signal and to feed selectively a signal from the bidirectional binary adder to said unidirectional binary adder to advance the occurrence of a probe pulse signal.

13. A synchronous adapter comprising a source of clock pulse signals, a unidirectional binary adder fed by said source of clock pulse signals to generate probe pulse signals, an error detector means having a forward mode of operation and a reverse mode of operation, an input means energized by received line signals to couple selectively said error detector means to said source of clock pulse signals, a count direction control means fed by said unidirectional binary adder coupled to condition said error detector means to its forward mode of operation or its reverse mode of operation, an error corrector means fed by said source of clock pulse signals and said input means coupled to block a signal fed from said source of clock pulse signals to said unidirectional binary adder to retard the occurrence of a probe pulse signal and to feed selectively a signal from the error detector means to said unidirectional binary adder to advance the occurrence of a probe pulse signal, and a reset means fed by said error corrector means coupled to drive said error detector means to an initial condition.

14. A synchronous adapter comprising a source of clock pulse signals, a unidirectional binary adder fed by said source of clock pulse signals to generate probe pulse signals, a bidirectional binary adder having a forward mode of operation and a reverse mode of operation, an input means energized by received line signals to couple selectively said bidirectional binary adder to said source of clock pulse signals, a count direction control means fed by said corrector means coupled to condition said bidirectional binary adder to its forward mode of operation or its reverse mode of operation, an error corrector means fed by said source of clock pulse signals and said input means coupled to block a signal fed from said source of clock pulse signals to said unidirectional binary adder to retard the occurrence of a probe pulse signal and to feed selectively a signal from the bidirectional binary adder to said unidirectional binary adder to advance the occurrence of a probe pulse signal, and a reset means fed by said error corrector means coupled to drive said bidirectional binary adder to an initial condition.

15. A synchronous adapter comprising a source of clock pulse signals, a unidirectional binary adder fed by said source of clock pulse signals to generate probe pulse signals, an error detector means having a forward mode of operation and a reverse mode of operation, an input means energized by received line signals to couple selectively said error detector means to said source of clock pulse signals, a first bistable network fed by said unidirectional binary adder coupled to condition said error detector means to its forward mode of operation or its reverse mode of operation, a second bistable network fed by said source of clock pulse signals and said input means coupled to block a signal fed from said source of clock pulse signals to said unidirectional binary adder to retard the occurrence of a probe pulse signal and to feed selectively a signal from the error detector means to said unidirectional binary adder to advance the occurrence of a probe pulse signal, and a reset means fed by said second bistable network coupled to drive said error detector means to an initial condition.

16. A synchronous adapter comprising a source of clock pulse signals, a unidirectional binary adder fed by said source of clock pulse signals to generate probe pulse signals, a bidirectional binary adder having a forward mode of operation and a reverse mode of operation, an input means energized by received line signals to couple selectively said bidirectional binary adder to said source of clock pulse signals, a first bistable network fed by said unidirectional binary adder coupled to condition said bidirectional binary adder to its forward mode of operation or its reverse mode of operation, a second bistable network fed by said source of clock pulse signals and said input means coupled to block a signal fed from said source of clock pulse signals to said unidirectional binary adder to retard the occurrence of a probe pulse signal and to feed selectively a signal from the bidirectional binary adder to said unidirectional binary adder to advance the occurrence of a probe pulse signal, and a reset means fed by said second bistable network coupled to drive said bidirectional binary adder to an initial condition.

17. A synchronous adapter comprising a source of clock pulse signals, a multiple stage unidirectional binary adder fed by said source of clock pulse signals to generate probe pulse signals, a multiple stage bidirectional binary adder having a forward mode of operation and a reverse mode of operation, an input means energized by received line signals to couple selectively said bidirectional binary adder to said source of clock pulse signals, a first bistable network fed by said unidirectional binary adder coupled to condition said bidirectional binary adder to its forward mode of operation or its reverse mode of operation, a second bistable network fed by said source of clock pulse signals and said input means coupled to block a signal fed from said source of clock pulse signals to said unidirectional binary adder to retard the occurrence of a probe pulse signal and to feed selectively a signal from the bidirectional binary adder to said unidirectional binary adder to advance the occurrence of a probe pulse signal, a reset gate coupled to each stage of said multiple stage direction binary adder, and a reset driver interposed between said second bistable network and said reset gate to drive said bidirectional binary adder to an initial condition.

18. A synchronous adapter comprising a source of clock pulse signals, a multiple stage unidirectional binary adder fed by said source of clock pulse signals to generate probe pulse signals, a multiple stage bidirectional binary adder having a forward mode of operation and a reverse mode of operation, an error direction control means coupled as the last stage of said multiple stage bidirectional binary adder, an input means energized by received line signals to couple selectively said bidirectional binary adder to said source of clock pulse signals, a first bistable network fed by said unidirectional binary adder coupled to condition said bidirectional binary adder to its forward mode of operation or its reverse mode of operation, an AND gate, a second bistable network fed by said source of clock pulse signals and said input means coupled to block a signal fed from said source of clock pulse signals to said unidirectional binary adder to retard the occurrence of a probe pulse signal and to feed selectively a signal from the error direction control means through said AND gate to said unidirectional binary adder to advance the occurrence of a probe pulse signal, a reset gate coupled to each stage of said multiple stage bidirectional binary adder, and a reset driver interposed between said second bistable network and said reset gate to drive said multiple stage bidirectional binary adder to an initial condition.

19. A synchronous adapter comprising a source of clock pulse signals; a multiple stage unidirectional binary adder fed by said source of clock pulse signals to generate probe pulse signals; a multiple stage bidirectional binary adder having a forward mode of operation and a reverse mode of operation; an error direction control means coupled as the last stage of said multiple stage bidirectional binary adder; a buffer energized by received line signals; a line transition detector fed by said buffer; a count period means fed by said line transition detector to couple selectively said bidirectional binary adder to said source of clock pulse signals; a first bistable network fed by said unidirectional binary adder coupled to condition said bidirectional binary adder to its forward mode of operation or its reverse mode of operation; an AND gate; a second bistable network fed by said source of clock pulse signals, said buffer and said count period means coupled to block a signal fed from said source of clock pulse signals to said unidirectional binary adder to retard the occurrence of a probe pulse signal and to feed selectively a signal from the error direction control means through said AND gate to said unidirectional binary adder to advance the occurrence of a probe pulse signal; a reset gate coupled to each stage of said multiple stage bidirectional binary adder; and a reset driver interposed between said second bistable network and said reset gate to drive said multiple stage bidirectional binary adder to an initial condition.

References Cited in the file of this patent
UNITED STATES PATENTS
2,934,604     Bizet _____ Apr. 26, 1960